(12) United States Patent
Fujimura et al.

(10) Patent No.: US 12,738,517 B2
(45) Date of Patent: Sep. 15, 2026

(54) GAS SUPPLY SYSTEM

(71) Applicant: TOYOTA JIDOSHA KABUSHIKI KAISHA, Toyota (JP)

(72) Inventors: Yoshikatsu Fujimura, Toyota (JP); Naoki Tomi, Kawasaki (JP); Tetsuya Tonosako, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/299,464

(22) Filed: Aug. 14, 2025

(65) Prior Publication Data

US 2026/0179982 A1 Jun. 25, 2026

(30) Foreign Application Priority Data

Dec. 23, 2024 (JP) ................................ 2024-226635

(51) Int. Cl.
*H01M 8/0438* (2016.01)
*H01M 8/04082* (2016.01)

(52) U.S. Cl.
CPC ... *H01M 8/04425* (2013.01); *H01M 8/04201* (2013.01)

(58) Field of Classification Search
CPC ................ F17C 7/00; F17C 2205/0323; F17C 2221/012; F17C 2250/03; F17C 2250/043; F17C 2260/036; F17C 2265/066; F17C 2270/0105; F17C 2270/0134; F17C 2270/0173; F17C 2270/0178; F17C 2270/0189; F17C 13/04; F17C 11/005; F17C 2250/0434; F17C 2260/038; B67D 7/3218; B67D 7/3209
USPC .......................................... 141/311 R; 222/3
See application file for complete search history.

(56) References Cited

U.S. PATENT DOCUMENTS

2023/0110816 A1* 4/2023 Mei ..................... H01M 16/006 429/454
2024/0209989 A1 6/2024 Hotta et al.

FOREIGN PATENT DOCUMENTS

JP 2024-089985 A 7/2024

* cited by examiner

*Primary Examiner* — Christopher M Afful
(74) *Attorney, Agent, or Firm* — SoraIP, Inc.

(57) ABSTRACT

A gas supply system includes: a gas tank equipped with a self-closing valve; a gas supply pipe that connects the gas tank to a gas utilization device; and a sealing member. As the gas tank approaches the gas supply pipe, the self-closing valve opens. When a threshold amount of gas fails to be removed from the gas supply pipe within a threshold time after the self-closing valve is closed, the controller outputs a gas removal failure signal. When the threshold amount of gas is successfully removed within the threshold time, the controller calculates an estimate of the pressure in the gas supply pipe after the gas removal. When a measured value from a pressure sensor after the removal of the threshold amount of gas is higher than the estimated value, the controller outputs a valve abnormality signal indicating an abnormality in the self-closing valve.

3 Claims, 4 Drawing Sheets

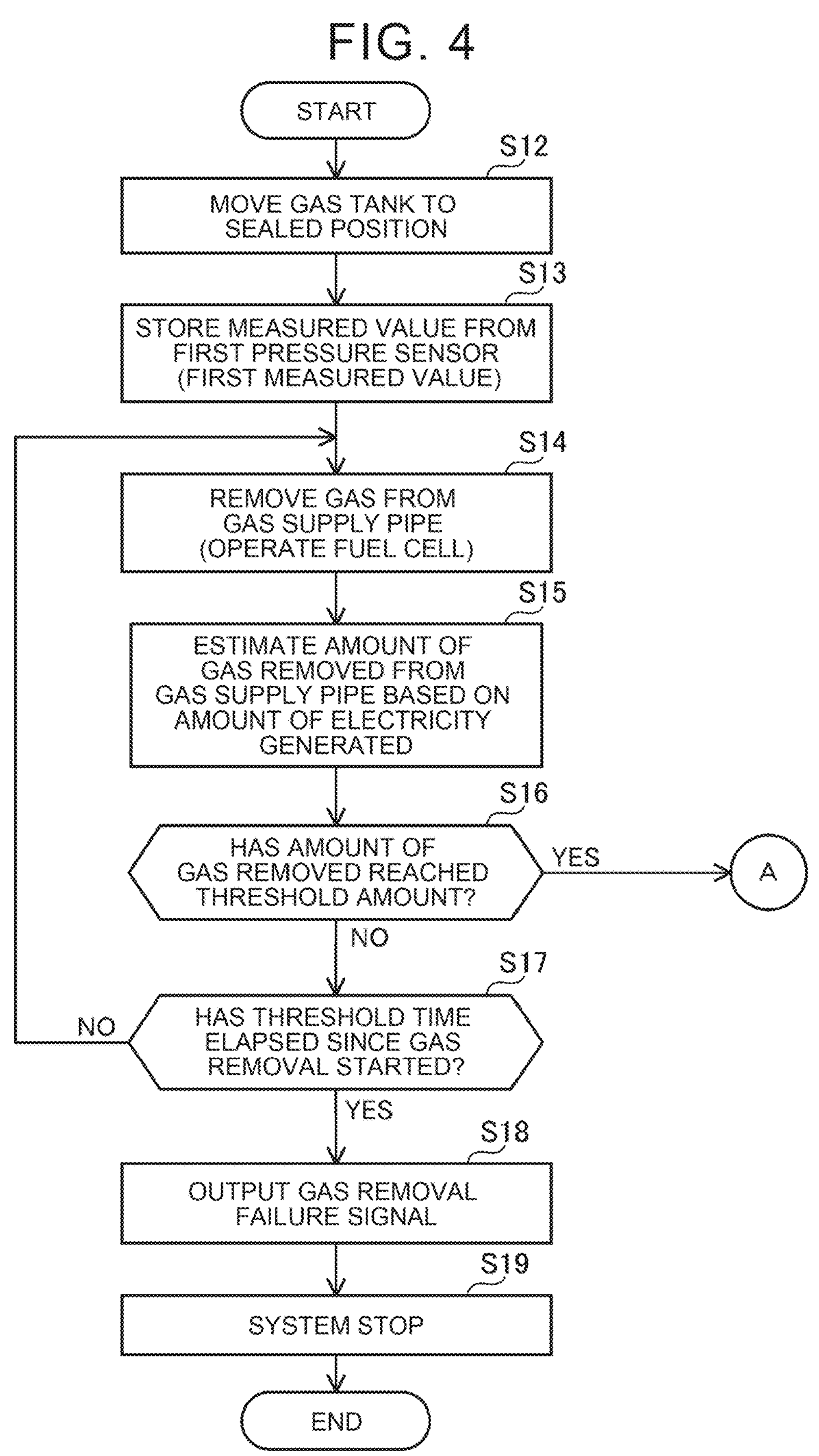
FIG. 4
START
S12
MOVE GAS TANK TO SEALED POSITION
S13
STORE MEASURED VALUE FROM FIRST PRESSURE SENSOR (FIRST MEASURED VALUE)
S14
REMOVE GAS FROM GAS SUPPLY PIPE (OPERATE FUEL CELL)
S15
ESTIMATE AMOUNT OF GAS REMOVED FROM GAS SUPPLY PIPE BASED ON AMOUNT OF ELECTRICITY GENERATED
S16
HAS AMOUNT OF GAS REMOVED REACHED THRESHOLD AMOUNT?
YES
A
NO
S17
HAS THRESHOLD TIME ELAPSED SINCE GAS REMOVAL STARTED?
NO
YES
S18
OUTPUT GAS REMOVAL FAILURE SIGNAL
S19
SYSTEM STOP
END

GAS SUPPLY SYSTEM

CROSS-REFERENCE TO RELATED APPLICATION

This application claims priority to Japanese Patent Application No. 2024-226635 filed on Dec. 23, 2024. The disclosure of the above-identified application, including the specification, drawings, and claims, is incorporated by reference herein in its entirety.

BACKGROUND

1. Technical Field

The technique disclosed in the present specification relates to gas supply systems that supply gas from a gas tank to a gas utilization device.

2. Description of Related Art

Japanese Unexamined Patent Application Publication No. 2024-089965 (JP 2024-089965 A) discloses a gas supply system that supplies gas from a gas tank to a gas utilization device. The gas supply system disclosed in JP 2024-089965 A checks whether the main shut-off valve of the gas tank is securely closed prior to removal of the gas tank from the system. During the check of the main shut-off valve, the gas supply system consumes a predetermined amount of gas in the gas supply pipe that connects the gas tank and the gas utilization device, thereby reducing the internal pressure of the gas supply pipe.

SUMMARY

However, in the gas supply system disclosed in JP 2024-089965 A, if gas in the gas supply pipe is not actually consumed during the check of the main shut-off valve, the pressure in the gas supply pipe may not decrease, and the check of the main shut-off valve may not be performed properly. The present disclosure provides a gas supply system capable of more reliably determining whether the main shut-off valve is operating properly.

A gas supply system disclosed in the present specification includes: a gas tank provided with a self-closing valve; a gas supply pipe; an actuator; a sealing member; a pressure sensor; and a controller. The self-closing valve of the gas tank is configured to open when a push rod is pushed in and close when the push rod is withdrawn. The self-closing valve corresponds to the main shut-off valve of the gas tank. The gas tank is connectable to the gas supply pipe. The gas supply pipe includes the push rod at its distal end, and is configured to guide gas from the gas tank to a gas utilization device. The actuator is configured to move the gas tank forward and backward relative to the gas supply pipe. The sealing member is configured to seal a connection space that includes an opening of the self-closing valve and the distal end of the gas supply pipe, when the distance between the self-closing valve and the push rod becomes shorter than a predetermined threshold distance. The pressure sensor is configured to measure the pressure in the gas supply pipe.

The controller is configured to perform the following self-closing valve check process while the gas tank is connected to the gas supply pipe. (1) The controller moves the gas tank backward to a position in which the self-closing valve is closed while maintaining sealing of the connection space. (2) The controller acquires a measured value (first measured value) from the pressure sensor. (3) The controller removes a predetermined threshold amount of gas from the gas supply pipe within a predetermined threshold time, and when the threshold amount of gas fails to be removed from the gas supply pipe within the threshold time, outputs a gas removal failure signal indicating a failure of gas removal. Through the process in (3), it can be verified that the threshold amount of gas has been successfully removed from the gas supply pipe.

(4) When the threshold amount of gas is successfully removed within the threshold time, the controller calculates an estimated value of the pressure in the gas supply pipe after removal of the threshold amount of gas, based on the first measured value and the threshold amount. (5) The controller acquires a measured value (second measured value) from the pressure sensor after the removal of the threshold amount of gas. (6) When the second measured value is higher than the estimated value, the controller outputs a valve abnormality signal indicating an abnormality in the self-closing valve. The gas supply system disclosed in the present specification is capable of more reliably determining whether the self-closing valve (main shut-off valve) is operating properly.

Details of the technique disclosed in the present specification and further improvements will be described in the "DETAILED DESCRIPTION OF EMBODIMENTS" below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a flowchart of a self-closing valve check process; and

DETAILED DESCRIPTION OF EMBODIMENTS

Figure 1:
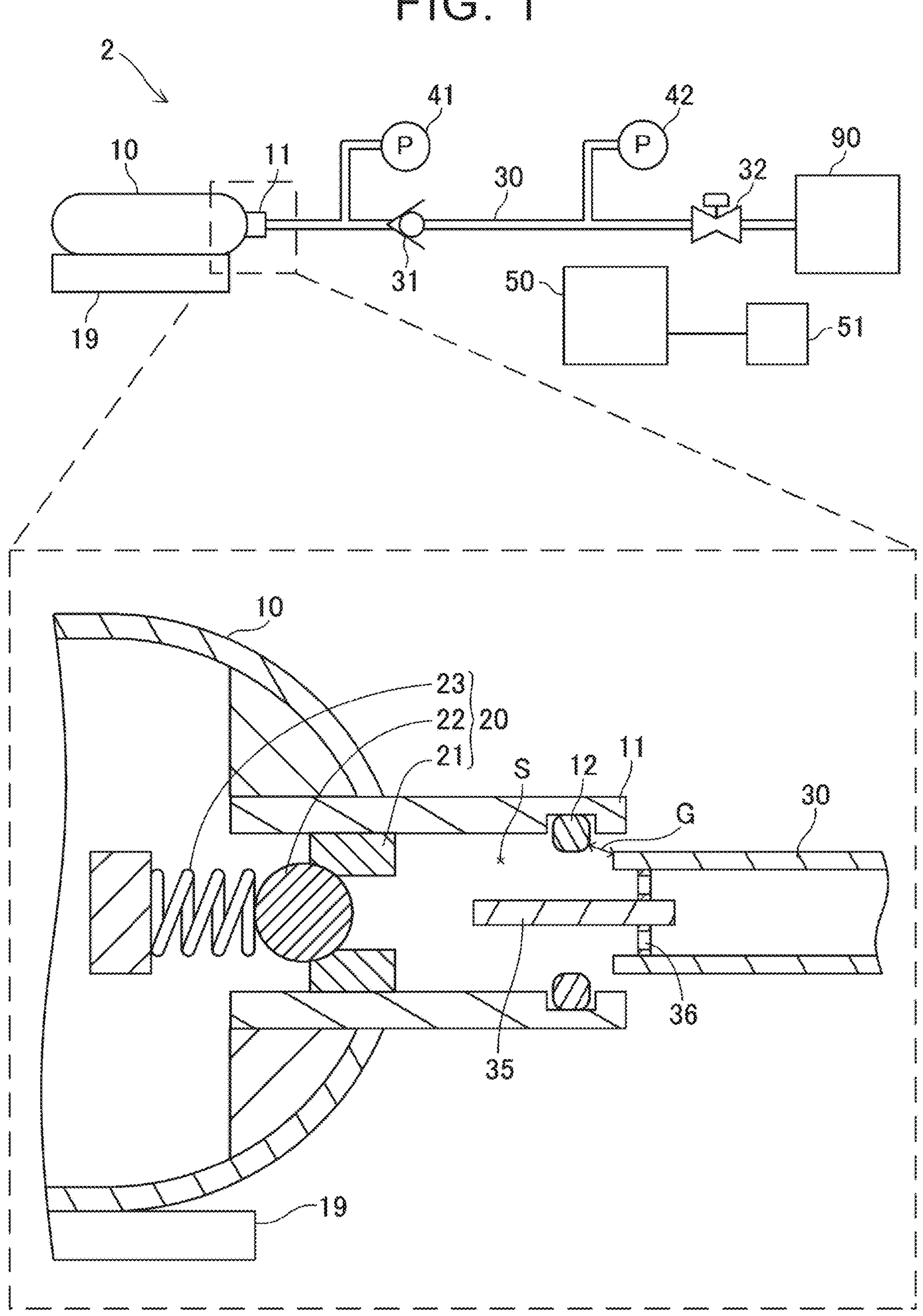
FIG. 1 is a block diagram of a gas supply system according to an embodiment.

A gas supply system 2 according to an embodiment will be described with reference to the drawings. FIG. 1 is a block diagram of the gas supply system 2. A fuel cell 90 is connected to the gas supply system 2 of the embodiment, and the gas supply system 2 supplies hydrogen gas from a gas tank 10 to the fuel cell 90. The fuel cell 90 is an example of a gas utilization device to which the gas supply system 2 supplies gas.

The gas supply system 2 includes the gas tank 10, a gas supply pipe 30, a push rod 35, an actuator 19, a first pressure sensor 41, a second pressure sensor 42, a check valve 31, a controller 50, and a display device 51.

The gas tank 10 is filled with high-pressure hydrogen gas. The gas tank 10 and the fuel cell 90 are connected via the gas supply pipe 30. The gas supply pipe 30 guides hydrogen gas from the gas tank 10 to the fuel cell 90. The check valve 31 and a pressure-reducing valve 32 are connected to the gas supply pipe 30. The pressure-reducing valve 32 is disposed downstream of the check valve 31. As used herein, the term "downstream" refers to the side of the gas supply pipe 30 that is closer to the fuel cell 90 (i.e., the gas utilization device), and the term "upstream" refers to the side closer to the gas tank 10.

The pressure-reducing valve 32 reduces the pressure of hydrogen gas supplied from the gas tank 10 to a level suitable for operation of the fuel cell 90. That is, the pressure of gas suitable for the fuel cell 90 is lower than the pressure of gas supplied from the gas tank 10.

The check valve 31 allows gas to flow from upstream to downstream and does not allow gas to flow from downstream to upstream. The check valve 31 blocks hydrogen gas from leaking to the outside from downstream of the check valve 31 in the event of a gas leak at the connection between the gas tank 10 and the gas supply pipe 30.

The first pressure sensor 41 measures the pressure in the gas supply pipe 30 upstream of the check valve 31. When the gas tank 10 is connected to the gas supply pipe 30, the pressure measured by the first pressure sensor 41 in a state in which gas is not flowing is equal to the internal pressure of the gas tank 10.

The second pressure sensor 42 measures the pressure in the gas supply pipe 30 downstream of the check valve 31. While gas is being supplied from the gas tank 10, the pressure measured by the second pressure sensor 42 is approximately equal to that measured by the first pressure sensor 41 (the value measured by the second pressure sensor 42 is slightly lower than that measured by the first pressure sensor 41 due to pressure loss caused by the check valve 31 etc.). When gas flow stops, the pressure measured by the second pressure sensor 42 becomes equal to that measured by the first pressure sensor 41.

A sectional view of a boss 11 of the gas tank 10 and a distal end of the gas supply pipe 30 is shown in the lower portion of FIG. 1. The boss 11 of the gas tank 10 is provided with a self-closing valve 20. The self-closing valve 20 includes a sleeve 21, a valve body 22, and a spring 23. The sleeve 21 is mounted inside the boss 11. The valve body 22 is disposed adjacent to the sleeve 21 inside the tank. The spring 23 presses the valve body 22 against the opening of the sleeve 21 (the opening that opens into the interior of the tank) from inside the tank. The opposite end of the spring 23 is supported by the inner wall of the tank.

The valve body 22 is pressed into close contact with the opening of the sleeve 21 by the force of the spring 23. While the valve body 22 is in close contact with the opening of the sleeve 21, the self-closing valve 20 remains closed. When the valve body 22 is pushed inward from outside the tank, the self-closing valve 20 opens. When the load on the valve body 22 is removed, the valve body 22 is again pressed against the opening of the sleeve 21 by the force of the spring 23, thereby closing the self-closing valve 20.

The push rod 35 is provided at the distal end of the gas supply pipe 30. The push rod 35 is fixed to the distal end of the gas supply pipe 30 by a rod support 36. The rod support 36 is provided with a hole through which gas can flow from the gas tank 10 into the gas supply pipe 30.

When the gas tank 10 is set in the gas supply system 2, the push rod 35 at the distal end of the gas supply pipe 30 faces the boss 11. The actuator 19 moves the gas tank 10. The actuator 19 moves the gas tank 10 toward or away from the gas supply pipe 30. More specifically, the actuator 19 moves the self-closing valve 20 toward or away from the distal end of the gas supply pipe 30 (i.e., the push rod 35). The sectional view in FIG. 1 shows a state in which the push rod 35 is separated from the self-closing valve 20.

The actuator 19 moves the gas tank 10 forward and backward relative to the distal end of the gas supply pipe 30. For convenience of description, movement of the gas tank 10 toward the gas supply pipe 30 is referred to as "forward movement," and movement of the gas tank 10 away from the gas supply pipe 30 is referred to as "backward movement." The actuator may alternatively be configured to move the gas supply pipe 30 forward and backward relative to the gas tank 10.

A sealing member 12 is disposed inside the boss 11. When the distal end of the gas supply pipe 30 (i.e., the push rod 35) approaches the self-closing valve 20, the outer periphery of the gas supply pipe 30 comes into contact with the sealing member 12, and the space including the opening of the self-closing valve 20 (the opening that opens toward the outside of the gas tank 10) and the distal end of the gas supply pipe 30 is sealed. For convenience of description, the space including the opening of the self-closing valve 20 and the distal end of the gas supply pipe 30 is referred to as "connection space S." More specifically, the connection space S refers to a space inside the boss 11 that includes the opening of the self-closing valve 20 and the distal end of the gas supply pipe 30. In the sectional view of FIG. 1, the push rod 35 is separated from the self-closing valve 20, and a gap G is maintained between the distal end of the gas supply pipe 30 and the sealing member 12. In this state, the connection space S is not sealed from the external environment.

Figure 2:
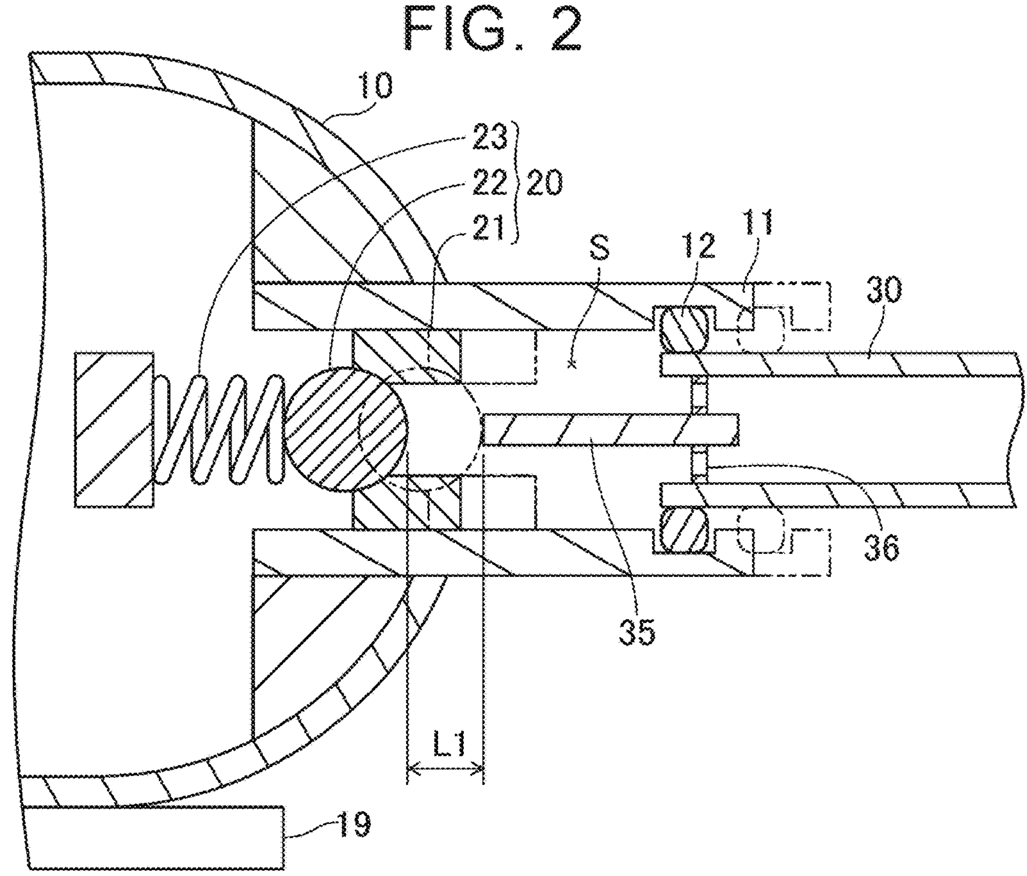
FIG. 2 is a sectional view of a gas tank and a gas supply pipe (sealed position)

FIG. 2 shows a cross-section in a state in which the distal end of the gas supply pipe 30 is in contact with the sealing member 12. When the distance between the push rod 35 and the self-closing valve 20 reaches a distance L1, the sealing member 12 comes into contact with the outer periphery of the gas supply pipe 30, and the connection space S is sealed. In other words, when the distance between the push rod 35 and the valve body 22 of the self-closing valve 20 becomes shorter than L1, the connection space S is isolated from the outside. When the distance between the push rod 35 and the valve body 22 is equal to L1, the self-closing valve 20 remains closed. The distance L1 may be referred to as "threshold distance."

Figure 3:
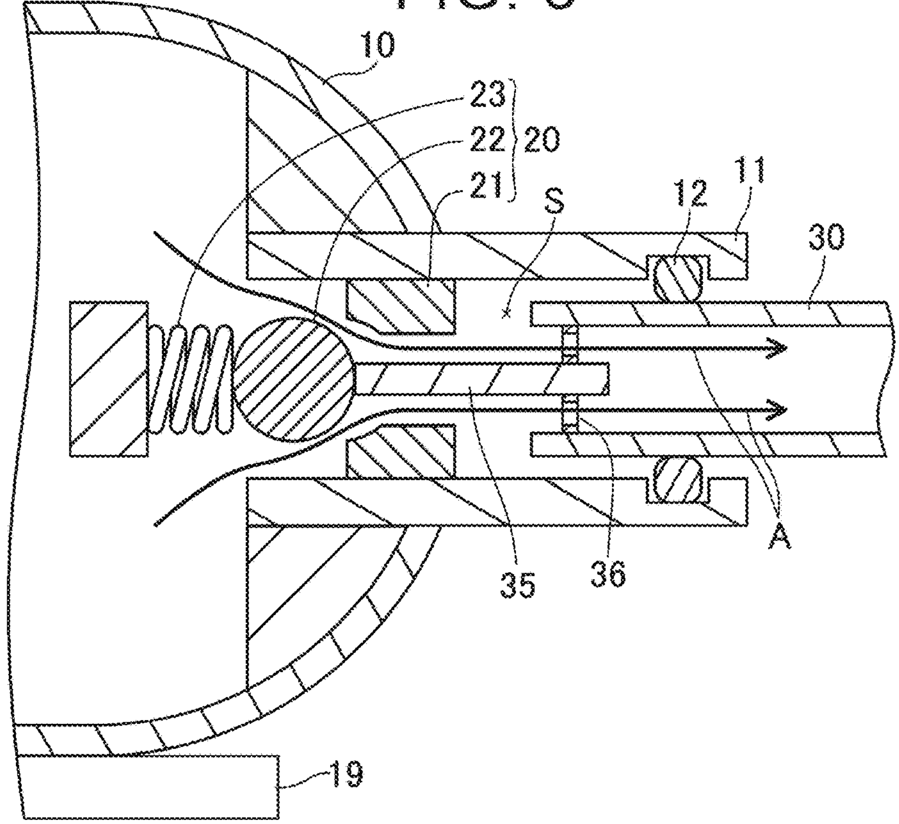
FIG. 3 is a sectional view of the gas tank and the gas supply pipe (valve-open position)

The phantom lines in FIG. 2 indicate a state in which the gas tank 10 has moved forward to a position in which the valve body 22 comes into contact with the distal end of the push rod 35. When the gas tank 10 moves forward beyond the phantom lines, the push rod 35 pushes open the self-closing valve 20. FIG. 3 is a sectional view showing a state in which the gas tank 10 has moved forward until the self-closing valve 20 is opened. The thick arrows A indicate the flow of gas. While the self-closing valve 20 is open, hydrogen gas inside the gas tank 10 flows through the connection space S into the gas supply pipe 30. Since the connection space S is sealed by the sealing member 12, hydrogen gas does not leak to the outside.

Gas inside the gas tank 10 passes through the opened self-closing valve 20, flows through the hole in the rod support 36, and enters the gas supply pipe 30. For convenience of description, the position of the gas tank 10 in which the connection space S is sealed but the self-closing valve 20 is closed is referred to as "sealed position," and the position of the gas tank 10 in which the connection space S is sealed and the self-closing valve 20 is open is referred to as "valve-open position." FIG. 2 is a sectional view in the sealed position, and FIG. 3 is a sectional view in the valve-open position. The sealed position refers to a state in which the distance between the push rod 35 and the valve body 22 of the self-closing valve 20 is greater than zero and less than or equal to L1. In the valve-open position as well, the sealing member 12 is still in contact with the outer periphery of the gas supply pipe 30, and the connection space S remains sealed.

The position of the gas tank 10 in which the connection space S is unsealed and thus open to the external environment as a result of the gas tank 10 moving backward will be referred to as "detached position" (see FIG. 1).

When a new gas tank 10 is set on the actuator 19, the controller 50 (see FIG. 1) moves the gas tank 10 forward to the valve-open position. As the self-closing valve 20 opens, gas from the gas tank 10 flows through the check valve 31 and the pressure-reducing valve 32 to the fuel cell 90. The fuel cell 90 becomes operational. The controller 50 activates the fuel cell 90.

When the remaining amount of gas in the gas tank 10 becomes low, the gas tank 10 needs to be replaced. If a malfunction occurs in the self-closing valve 20 during removal of the old gas tank 10, hydrogen gas may leak to the outside. Therefore, prior to moving the gas tank 10 backward to the detached position, the controller 50 performs a self-closing valve check process. Specifically, when the remaining amount of gas in the gas tank 10 falls below a predetermined threshold while the gas supply pipe 30 is connected to the gas tank 10 and the self-closing valve 20 is open, the controller 50 performs a self-closing valve check process to determine whether the self-closing valve 20 is operating properly.

Figure 5:
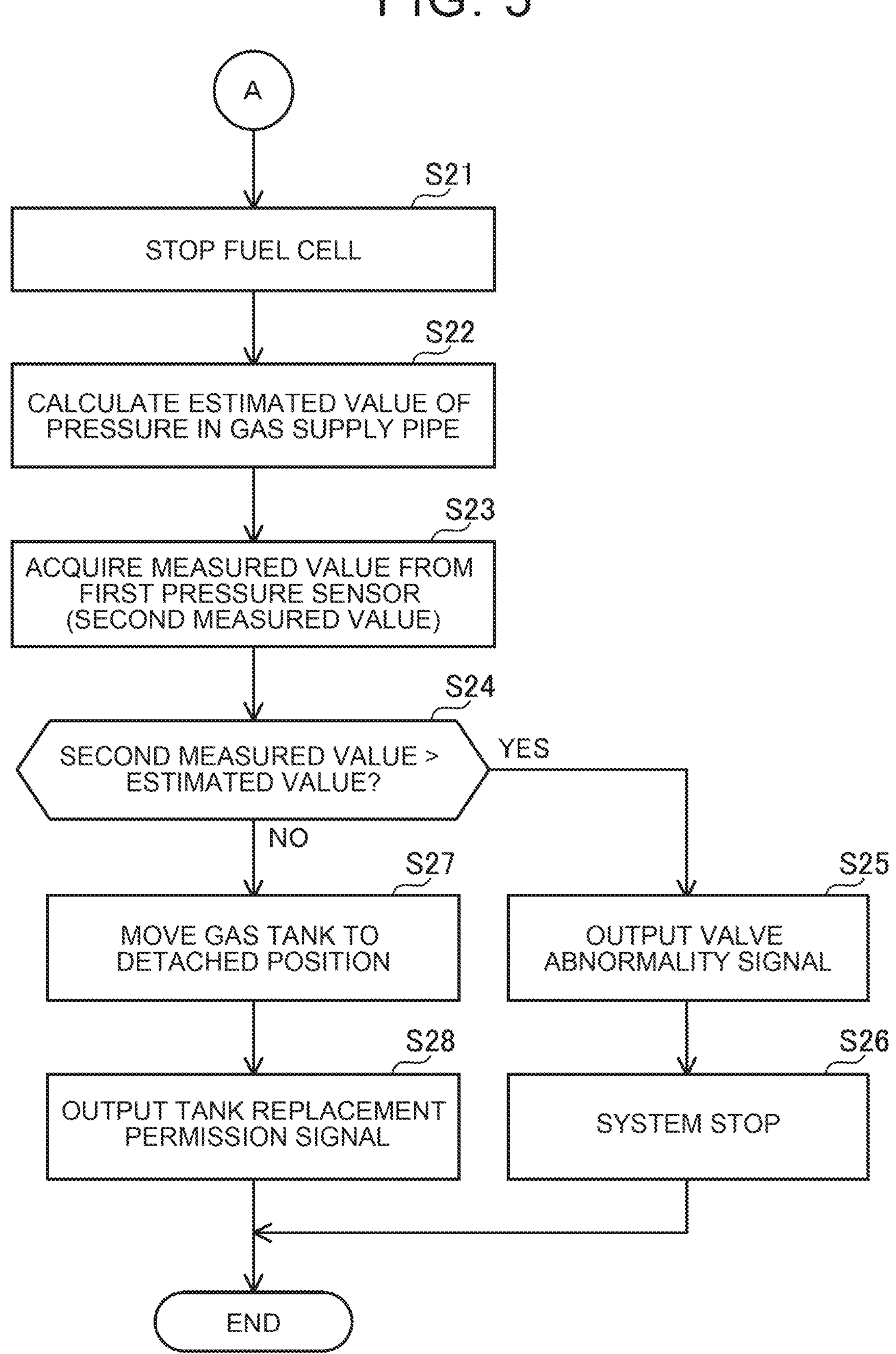
FIG. 5 is a flowchart of the self-closing valve check process (continued from FIG. 4).

FIGS. 4 and 5 are flowcharts illustrating the self-closing valve check process that is performed by the controller 50. First, the controller 50 controls the actuator 19 to move the gas tank 10 to the sealed position (step S12). In the sealed position, the self-closing valve 20 is closed, but the connection space S remains sealed.

Next, the controller 50 acquires a measured value from the first pressure sensor 41 (step S13). The measured value from the first pressure sensor 41 represents the pressure in the gas supply pipe 30. Hereinafter, the measured value from the first pressure sensor 41 obtained in step S13 is referred to as "first measured value."

The controller 50 then removes a predetermined threshold amount of gas from the gas supply pipe 30 (step S14). Specifically, the controller 50 removes gas from the gas supply pipe 30 by operating the fuel cell 90 to consume the gas (hydrogen gas) in the gas supply pipe 30. At this time, the controller 50 stores the amount of electricity (power generation amount) generated by the fuel cell 90. There is a certain relationship between the amount of electricity generated by the fuel cell 90 and the amount (mass) of hydrogen gas consumed by the fuel cell 90. The controller 50 estimates the amount of gas consumed (i.e., the mass of hydrogen gas consumed) from the amount of electricity generated by the fuel cell 90, based on this relationship (step S15). The amount of gas consumed by the fuel cell 90 is equal to the amount of gas removed from the gas supply pipe 30. The controller 50 continues to operate the fuel cell 90 until the amount of gas removed from the gas supply pipe 30 reaches the threshold amount (step S16: NO→S17: NO→S14, or step S16: YES→S21).

When the amount of gas removed does not reach the threshold amount even after a predetermined threshold time has elapsed since the start of gas removal, the controller 50 outputs a gas removal failure signal to the display device 51, indicating the failure to remove the threshold amount of gas from the gas supply pipe 30 (step S17: YES→S18). In response to the gas removal failure signal, the display device 51 turns on a warning lamp indicating that the threshold amount of gas could not be removed from the gas supply pipe 30 (or emits a warning sound). For example, if the check valve 31 is malfunctioning, gas may flow from downstream to upstream through the check valve 31, resulting in a longer time required for gas removal. As a result, it may not be possible to remove the threshold amount of gas within the threshold time. Finally, the controller 50 stops the gas supply system 2 and the fuel cell 90 (step S19).

When the threshold amount of gas is removed from the gas supply pipe 30 before the threshold time elapses, the controller 50 stops the fuel cell 90 (step S16: YES→S21).

The controller 50 then calculates an estimated value of the pressure inside the gas supply pipe 30 after the removal of the threshold amount of gas (step S22). The controller 50 calculates the estimated value of the pressure inside the gas supply pipe 30 after the removal of the threshold amount of gas, based on the first measured value (i.e., the internal pressure of the gas supply pipe 30 before the removal of the threshold amount of gas), the threshold amount (i.e., the amount of gas removed from the gas supply pipe 30), and the temperature inside the gas supply pipe 30. Although not shown in the figures, the gas supply system 2 includes a temperature sensor that measures the temperature inside the gas supply pipe 30. As described above, the threshold amount refers to the mass of hydrogen gas. Since the capacity of the gas supply pipe 30 is known, the pressure inside the gas supply pipe 30 after the removal of the threshold amount of gas can be calculated from the above parameters. The first measured value is equal to the pressure inside the gas tank 10. The estimated pressure in the gas supply pipe 30 after the removal of the threshold amount of gas is lower than the first measured value.

The controller 50 again acquires the measured value from the first pressure sensor 41 (i.e., the pressure inside the gas supply pipe 30 after the removal of the threshold amount of gas) (step S23). Hereinafter, the measured value obtained from the first pressure sensor 41 after the removal of the threshold amount of gas is referred to as "second measured value."

The controller 50 compares the second measured value with the estimated value calculated in step S22 (step S24). When a malfunction has occurred in the self-closing valve 20 and gas from the gas tank 10 has leaked into the gas supply pipe 30, the second measured value becomes higher than the estimated value (step S24: YES). In that case, the controller 50 outputs a valve abnormality signal indicating that an abnormality has occurred in the self-closing valve 20 (step S25). In response to the valve abnormality signal, the display device 51 turns on a warning lamp (or emits a warning sound) to indicate that an abnormality has occurred in the self-closing valve 20. The controller 50 then stops the gas supply system 2 (step S26).

When NO in step S24, it means that the second measured value is equal to the estimated value. The second measured value being equal to the estimated value indicates that the self-closing valve 20 is properly closed. In this case, the controller 50 moves the gas tank 10 to the detached position and transmits a tank replacement permission signal to the display device 51 (step S27→S28). In response to the tank replacement permission signal, the display device 51 displays a message indicating that the old gas tank 10 may be replaced with a new gas tank 10. Upon seeing the message, the operator removes the old gas tank 10 from the actuator 19 and sets a new gas tank 10 on the actuator 19.

The self-closing valve 20 of the gas tank 10 corresponds to the main shut-off valve of the gas tank 10. The gas supply system 2 performs the above self-closing valve check process before moving the gas tank 10 backward to the detached position. Steps S22 to S24 in FIG. 5 are the main steps for determining whether the self-closing valve 20 is properly closed. Prior to these steps, the controller 50 checks whether the threshold amount of gas has been properly removed from the gas supply pipe 30 within the threshold time (steps S13 to S17). By performing these steps, the gas supply system 2 can more reliably verify the proper operation of the self-closing valve 20 (the main shut-off valve of the gas tank 10).

Notes on the technique described in the embodiment will be provided below. The controller 50 can use the actuator 19 to move the gas tank 10 to any of the following positions: (1) the position in which the connection space S is sealed and the self-closing valve 20 is open (valve-open position), (2) the position in which the connection space S is sealed but the self-closing valve 20 is closed (sealed position), and (3) the position in which the connection space S is unsealed and the connection space S communicates with the external environment (detached position).

Before moving the gas tank 10, which is positioned at the valve-open position and has been supplying gas to the gas-consuming device, to the detached position, the controller 50 performs the following self-closing valve check process. (1) The controller 50 moves the gas tank 10 backward to the position in which the self-closing valve 20 is closed while maintaining the sealing of the connection space S (i.e., the sealed position). (2) The controller 50 acquires the measured value (first measured value) from the first pressure sensor 41. (3) The controller 50 removes the predetermined threshold amount of gas from the gas supply pipe 30 within the predetermined threshold time. When the threshold amount of gas cannot be removed within the threshold time, the controller 50 outputs a gas removal failure signal indicating the failure to remove the gas. (4) When the threshold amount of gas is successfully removed within the threshold time, the controller 50 calculates an estimated value of the pressure in the gas supply pipe 30 after the removal of the threshold amount of gas, based on the first measured value and the threshold amount. The threshold amount is expressed as the mass of gas. (5) The controller 50 acquires the measured value (second measured value) from the first pressure sensor 41 after the removal of the threshold amount of gas. (6) When the second measured value is higher than the estimated value, the controller 50 outputs a valve abnormality signal indicating an abnormality in the self-closing valve 20.

When the second measured value is equal to the estimated value, the controller 50 moves the gas tank 10 to the position in which the connection space S is unsealed (i.e., the detached position).

One example of a method for removing the threshold amount of gas from the gas supply pipe 30 is to operate the fuel cell 90, that is, the gas utilization device, to consume the hydrogen gas filling the gas supply pipe 30. At this time, the controller 50 measures the amount of electricity generated by the fuel cell 90 and calculates the amount of gas removed from the gas supply pipe 30 based on the generated amount of electricity.

The gas supply system 2 may remove gas from the gas supply pipe 30 by transferring gas from the gas supply pipe 30 to another tank (auxiliary tank). The amount of gas transferred to the auxiliary tank corresponds to the threshold amount. In this case, the threshold amount is expressed as a volume of gas. The volume of the gas supply pipe 30 is also known. The controller 50 can calculate an estimated value of the pressure in the gas supply pipe 30 after the removal of the threshold amount of gas, based on the volume of the gas supply pipe 30 (i.e., the threshold amount), the volume of the auxiliary tank, and the first measured value.

The signals output by the controller 50 (the gas removal failure signal and the valve abnormality signal) may be transmitted to a device other than the display device 51. For example, these signals may be transmitted to a controller that performs a response process in the event of an abnormality. The tank replacement permission signal may be transmitted to a mobile terminal of a staff member responsible for replacing the tank.

Although specific examples of the present disclosure have been described in detail above, these are merely illustrative and are not intended to limit the scope of claims. The scope of the claims encompasses modifications and variations of the specific examples illustrated above. The technical elements illustrated in the present specification or the drawings exhibit technical utility alone or in various combinations, and are not limited to the combinations set forth in the claims as originally filed. The techniques illustrated in the present specification or the drawings may achieve a plurality of objectives at the same time, and achieving even one of the objectives alone provides technical utility.

What is claimed is:

1. A gas supply system comprising:

a gas tank including a self-closing valve configured to open when a push rod is pushed in and close when the push rod is withdrawn;

a gas supply pipe to which the gas tank is connectable, the gas supply pipe including the push rod at a distal end of the gas supply pipe, and being configured to guide gas from the gas tank to a gas utilization device;

an actuator configured to move the gas tank forward and backward relative to the gas supply pipe;

a sealing member configured to seal a connection space that includes an opening of the self-closing valve and the distal end of the gas supply pipe, when a distance between the self-closing valve and the push rod becomes shorter than a predetermined threshold distance;

a pressure sensor configured to measure a pressure in the gas supply pipe; and a controller, wherein the controller is configured to move the gas tank backward to a position in which the self-closing valve is closed while maintaining sealing of the connection space, acquire a first measured value from the pressure sensor, remove a predetermined threshold amount of gas from the gas supply pipe within a predetermined threshold time, and when the threshold amount of gas fails to be removed within the threshold time, output a gas removal failure signal indicating a failure of gas removal, when the threshold amount of gas is successfully removed within the threshold time, calculate an estimated value of the pressure in the gas supply pipe after removal of the threshold amount of gas, based on the first measured value and the threshold amount;

acquire a second measured value from the pressure sensor after the removal of the threshold amount of gas; and when the second measured value is higher than the estimated value, output a valve abnormality signal indicating an abnormality in the self-closing valve.

2. The gas supply system according to claim 1, wherein the controller is configured to move the gas tank to a position in which the sealing of the connection space is released, when the second measured value is equal to the estimated value.

3. The gas supply system according to claim 1, wherein:

the gas tank is filled with hydrogen gas;

the gas utilization device is a fuel cell configured to generate electricity using the hydrogen gas from the gas tank; and the controller is configured to remove gas from the gas supply pipe by causing the fuel cell to generate electricity, and calculate an amount of the gas removed from the gas supply pipe based on an amount of the electricity generated by the fuel cell.

* * * * *